(12) United States Patent
Funatsu

(10) Patent No.: US 10,759,183 B2
(45) Date of Patent: *Sep. 1, 2020

(54) PRINTING APPARATUS AND IMAGE CORRECTION METHOD

(71) Applicant: KYOCERA Corporation, Kyoto-shi, Kyoto (JP)

(72) Inventor: Yohei Funatsu, Yokohama (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/309,815

(22) PCT Filed: Jun. 15, 2017

(86) PCT No.: PCT/JP2017/022219
§ 371 (c)(1),
(2) Date: Dec. 13, 2018

(87) PCT Pub. No.: WO2018/003533
PCT Pub. Date: Jan. 4, 2018

(65) Prior Publication Data
US 2019/0329567 A1    Oct. 31, 2019

(30) Foreign Application Priority Data
Jun. 28, 2016    (JP) .................... 2016-127436

(51) Int. Cl.
*B41J 2/21* (2006.01)
*B41J 2/045* (2006.01)
(Continued)

(52) U.S. Cl.
CPC .......... *B41J 2/2139* (2013.01); *B41J 2/0456* (2013.01); *B41J 2/04593* (2013.01); *B41J 2/04595* (2013.01); *B41J 2/2054* (2013.01); *H04N 1/605* (2013.01); *B41J 2002/14403* (2013.01); *G06K 15/107* (2013.01)

(58) Field of Classification Search
CPC ...... B41J 2/2139; B41J 2/0456; B41J 2/2054; B41J 2/04593
See application file for complete search history.

(56) References Cited

U.S. PATENT DOCUMENTS

2019/0263142 A1*    8/2019    Funatsu ............... B41J 29/393

FOREIGN PATENT DOCUMENTS

JP    04-018363 A    1/1992

\* cited by examiner

*Primary Examiner* — Jason S Uhlenhake
(74) *Attorney, Agent, or Firm* — Volpe and Koenig, P.C.

(57) ABSTRACT

A printing apparatus includes a printer with printing elements that print dots and a controller that acquires input image data. The controller acquires a pre-correction printing density that is based on test pattern data, which includes a uniform array of pixels, and printing characteristics of printing positions of the dots printed by the plurality of printing elements. The controller calculates a target density by averaging the pre-correction printing density and offsets the target density so that the target density is equal to or greater than the pre-correction printing density. The controller calculates a correction gain of the plurality of printing elements on the basis of the ratio of the target density to the pre-correction printing density and controls the printer on the basis of the correction gain and the input image data.

20 Claims, 11 Drawing Sheets

(51) Int. Cl.
    *B41J 2/20*           (2006.01)
    *B41J 2/205*         (2006.01)
    *H04N 1/60*         (2006.01)
    *B41J 2/14*          (2006.01)
    *G06K 15/10*        (2006.01)

PRINTING APPARATUS AND IMAGE CORRECTION METHOD

CROSS-REFERENCE TO RELATED APPLICATION

The present application claims priority to and the benefit of Japanese Patent Application No. 2016-127436 filed Jun. 28, 2016, the entire contents of which are incorporated herein by reference.

TECHNICAL FIELD

The present disclosure relates to a printing apparatus and an image correction method.

BACKGROUND

A known printing apparatus includes printing elements, and on the basis of a printed test pattern, corrects the size of the dot printed by each printing element so that the printing density becomes uniform. For example, see patent literature (PTL) 1.

CITATION LIST

Patent Literature

PTL 1: JPH418363A

SUMMARY

A printing apparatus according to an embodiment of the present disclosure includes a printer with a plurality of printing elements that print dots. The printing apparatus includes a controller that acquires input image data. The controller acquires a pre-correction printing density that is based on test pattern data, which includes a uniform array of pixels, and printing characteristics of printing positions of the dots printed by the plurality of printing elements. The controller calculates a target density by averaging the pre-correction printing density. The controller offsets the target density so that the target density is equal to or greater than the pre-correction printing density. The controller calculates a correction gain of the plurality of printing elements on the basis of the ratio of the target density to the pre-correction printing density. The controller controls the printer on the basis of the correction gain and the input image data.

An image correction method according to an embodiment of the present disclosure is an image correction method for a printing apparatus. The printing apparatus includes a printer with a plurality of printing elements that print dots. The printing apparatus includes a controller that controls the printer. The image correction method includes acquiring, using the controller, a pre-correction printing density that is based on test pattern data, which includes a uniform array of pixels, and printing characteristics of printing positions of the dots printed by the plurality of printing elements. The image correction method includes calculating, using the controller, a target density by averaging the pre-correction printing density. The image correction method includes offsetting, using the controller, the target density so that the target density is equal to or greater than the pre-correction printing density. The image correction method includes calculating, using the controller, a correction gain of the plurality of printing elements on the basis of the ratio of the target density to the pre-correction printing density. The image correction method includes controlling, using the controller, the printer on the basis of the correction gain and the input image data.

DETAILED DESCRIPTION

Correcting the size of printed dots so that the printing density becomes uniform may reduce the size of dots printed by printing elements with a relatively high printing density. A reduction in the size of printed dots may yield a grainier printing result. The present embodiment makes printing less grainy.

First Embodiment

Figure 1:
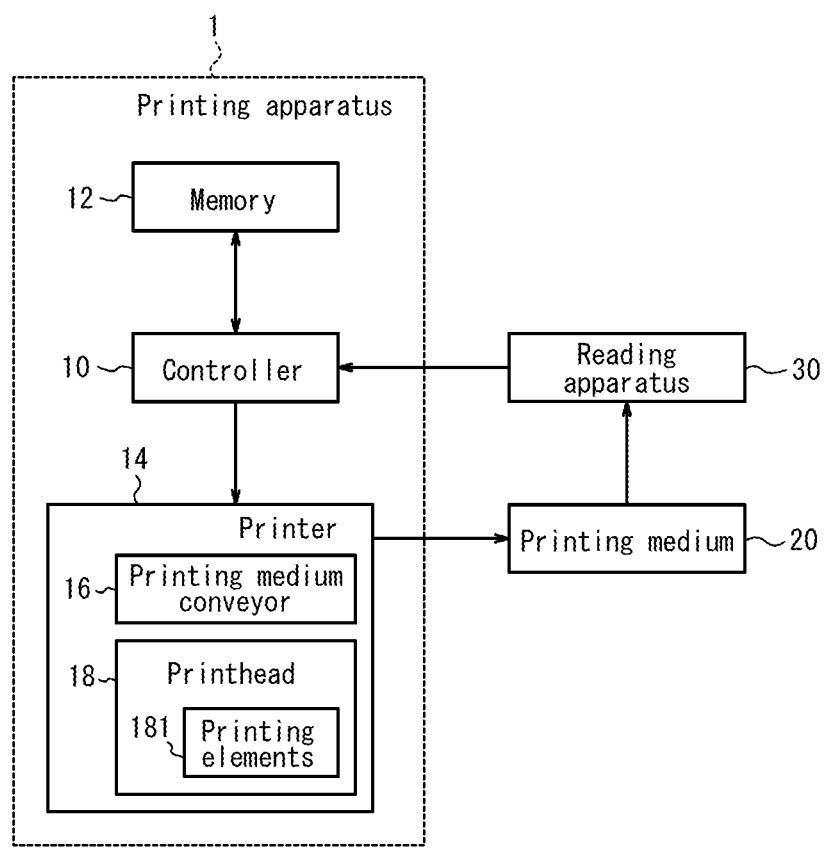
FIG. 1 is a functional block diagram schematically illustrating an example configuration of a printing apparatus according to a first embodiment.

As illustrated in FIG. 1, a printing apparatus 1 according to the present embodiment includes a controller 10, a memory 12, and a printer 14. The printing apparatus 1 prints on a printing medium 20 with the printer 14. The printing apparatus 1 causes a reading apparatus 30 to read the printing result on the printing medium 20. The printing apparatus 1 acquires the reading result from the reading apparatus 30.

The controller 10 acquires input image data from the memory 12 or an external apparatus. The controller 10 may store input image data acquired from an external apparatus in the memory 12. On the basis of the input image data, the controller 10 outputs control information to the printer 14 to cause the printer 14 to print on the printing medium 20. The controller 10 can, for example, be configured by a processor or microcomputer capable of executing application software.

The memory 12 can be configured by a semiconductor memory or the like. Various information, programs for causing the printing apparatus 1 to operate, and the like may be stored in the memory 12. The memory 12 may function as a working memory of the controller 10.

The printer 14 includes a printing medium conveyor 16 and a printhead 18. On the basis of control information from the controller 10, the printer 14 controls the printing medium conveyor 16 and the printhead 18 and prints on the printing medium 20.

The printing medium conveyor 16 conveys the printing medium 20 to the inside of the printing apparatus 1 and controls the position of the printing medium 20 in accordance with control information from the controller 10. The printing medium conveyor 16 can be configured to be capable of conveying the printing medium 20 in a predetermined direction. The "predetermined direction" may include one or a plurality of directions.

On the basis of control information from the controller 10, the printhead 18 prints on the printing medium 20. The printhead 18 includes printing elements 181. The printhead 18 controls the printing elements 181 to print dots on the printing medium 20. For example, the dots may be circular, but the dots may have any other shape instead. The printing elements 181 may, for example, print by ejecting ink onto the printing medium 20. The printing elements 181 may, for example, print by thermally transferring ink onto the printing medium 20. The printing elements 181 may print on the printing medium 20 by a variety of other methods. The printing elements 181 may print on the printing medium 20 by altering the printing medium 20.

The printing elements 181 are arrayed in the longitudinal direction of the printhead 18. The printing elements 181 are, for example, arrayed over a range equal to the width of the printing medium 20. The printing elements 181 may be arrayed over a range longer than the width of the printing medium 20. The printing elements 181 may be arrayed over a range shorter than the width of the printing medium 20.

Figure 2A:
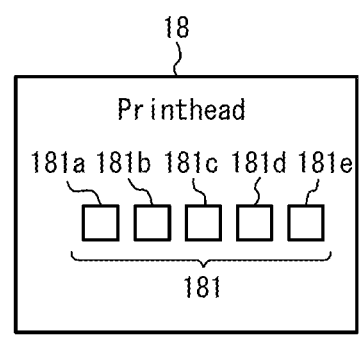
FIG. 2A illustrates an example configuration of a printhead.

The printing elements 181 may be arrayed in a single line, as illustrated in FIG. 2A. Printing elements 181a to 181e are arrayed in a single line in FIG. 2A. When not distinguishing between the printing elements 181a to 181e, the printing elements 181a to 181e are collectively referred to below as printing elements 181. The number of printing elements 181 is not limited to five. Four or fewer, or six or more, printing elements 181 may be included.

Figure 2B:
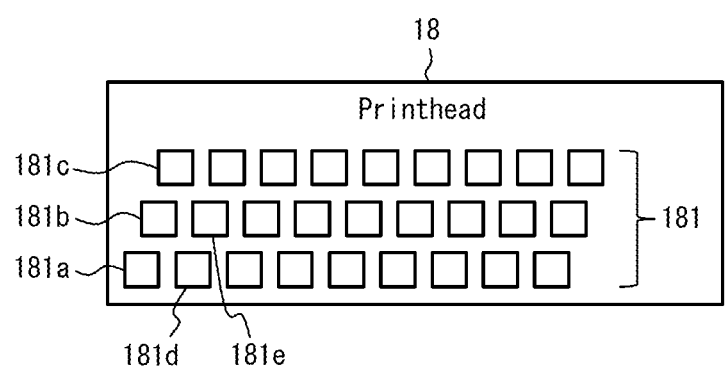
FIG. 2B illustrates an example configuration of a printhead.

As illustrated in FIG. 2B, the printing elements 181 may be arrayed over a plurality of rows, with each row being shifted a predetermined distance. The printing apparatus 1 sequentially operates the pair of printing elements 181a and 181d, the pair of printing elements 181b and 181e, and the printing element 181c while shifting the relative positions of the printhead 18 and the printing medium 20 in the transverse direction of the printhead 18. This allows five dots corresponding to the printing elements 181a to 181e to be printed in a row at a narrower pitch than the array pitch of the printing elements 181.

The printer 14 sequentially prints on the printing medium 20 while scanning the printhead 18 over the printing medium 20. The printer 14 may print on the printing medium 20 by fixing the position of the printhead 18 and displacing only the printing medium 20. The printer 14 may print on the printing medium 20 by fixing the position of the printing medium 20 and displacing only the printhead 18. The printer 14 may print on the printing medium 20 by displacing both the printhead 18 and the printing medium 20.

The printing medium 20 can be selected appropriately in accordance with the printing method of the printhead 18. For example, the printing medium 20 may be paper but is not limited to paper. Another material, such as resin, or a plurality of materials may be used. The printing medium 20 may be in roll or sheet form or may have another shape. The printing medium 20 may be rectangular or have another shape, such as a circle or an ellipse.

The reading apparatus 30 includes a light source that irradiates light onto a reading target and a sensor that detects reflected light or scattered light from the reading target. The reading apparatus 30 can read the printing result from the printing medium 20. The reading apparatus 30 outputs the reading result to the printing apparatus 1. The reading result includes information pertaining to the density distribution of the printing result.

The printing elements 181 have printing characteristics. The printing characteristics of the printing elements 181 include data pertaining to the gradations of density representable with dots printed by the printing elements 181. The gradations of density are, for example, determined by the size of dots. The gradations of density may be determined by the printing array of dots.

The printing characteristics include correction data indicating the difference between a printing result predicted on the basis of control information output by the controller 10 and the actual printing result. The correction data may include the printing positions of dots. The correction data on the printing position of dots defines the degree of shifting in the position at which dots are printed as compared to the printing position of dots predicted from the control information. The correction data may include the size of the printed dots. The correction data on the dot size defines the degree of difference in the size of printed dots as compared to the dot size predicted from the control information.

The correction data can be acquired from a test pattern printed on the printing medium 20. The printing apparatus 1 acquires test pattern data as input image data and prints a test pattern on the printing medium 20. The printing apparatus 1 causes the reading apparatus 30 to read the printed test pattern and acquires the result of reading the test pattern. The printing apparatus 1 analyzes the reading result of the test pattern and acquires the correction data of each printing element 181. The correction data of each printing element 181 can also be considered inspection data of each printing element 181 acquired from the printing result of the test pattern data.

The test pattern includes a printing pattern for acquiring the correction data of each printing element 181. For example, the test pattern may include a pattern allowing measurement of the shift in printing position of the dot of each printing element 181. The pattern allowing measurement of the shift in printing position of a dot may, for example, include a pattern indicating coordinates. The printing apparatus 1 can use the reading result of the pattern allowing measurement of the shift in printing position of a dot to calculate the difference between the position of the dot printed by each printing element 181 and the position predicted from the control information. The printing position of a dot may be acquired from the density distribution of the printed dot pattern. The printing position of a dot may be acquired from the printing result of a pattern that has a scale allowing measurement of the printing position. A variety of other methods can be used as the method of acquiring the printing position of a dot.

The test pattern may include a pattern allowing measurement of the size of the dot of each printing element 181. The pattern allowing measurement of the size of a dot may, for example, include a pattern indicating a scale. The printing apparatus 1 can use the reading result of the pattern allowing measurement of the size of a dot to calculate the difference between the size of the dot printed by each printing element 181 and the size predicted from the control information. The dot size may be acquired by measuring the density of the printed dot pattern. The dot size may be acquired by directly measuring an individual printed dot with a microscope or the like. A variety of other methods can be used as the method of acquiring the dot size.

The printing apparatus 1 may include either or both of the printing medium 20 and the reading apparatus 30. In this case, the printing apparatus 1 can print the test pattern and read the printing result internally to acquire the correction data of the printing elements 181 without using an external apparatus.

The input image data acquired by the printing apparatus 1 may, for example, be in bitmap format or any other format. The printing apparatus 1 according to the present embodiment is assumed to acquire input image data formed by pixels arranged in a grid pattern in bitmap format or the like. For example, the printing apparatus 1 according to the present embodiment prints on the basis of input image data so that dots are arrayed in a grid pattern on the printing medium 20. The dot array printed by the printing apparatus 1 is not limited to being a grid pattern and may have randomness. The printing apparatus 1 forms a printing result corresponding to the input image data by printing a collection of dots on the printing medium 20.

Figure 3:
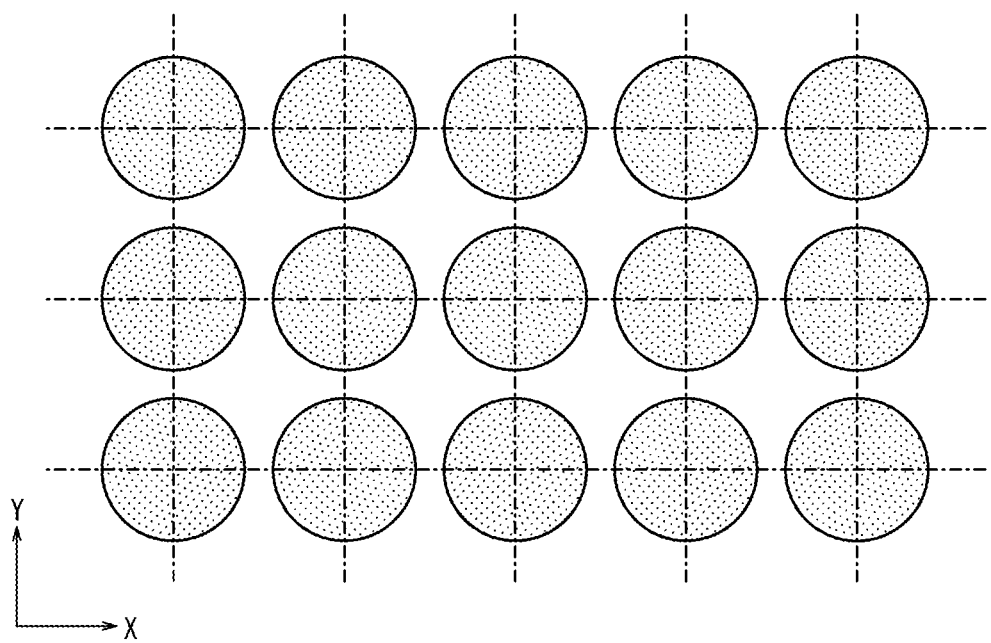
FIG. 3 illustrates an example dot pattern printed in a grid pattern on a printing medium.

As illustrated in FIG. 3, the dots may be printed at the intersections in a grid formed by dashed dotted lines extending in the X-axis direction and the Y-axis direction. The X-axis direction and the Y-axis direction are also referred to as the X-direction and the Y-direction.

The dot pattern in the example in FIG. 3 may appear to the human eye as a different pattern depending on the dot size and the array spacing. For example, each dot may be distinguishable when the array spacing is wide relative to the dot size. When the array spacing is narrow relative to the dot size, the dot pattern may appear to be a uniform-density solid pattern in which individual dots are not distinguishable. The spatial frequency of the dot pattern is determined by the dot size and the array spacing. In other words, the dot pattern may appear to the human eye as a different pattern depending on the spatial frequency.

The way the dot pattern appears to the human eye can be evaluated by the contrast sensitivity characteristics of the human eye. The contrast sensitivity characteristics are also referred to as contrast sensitivity function (CSF) characteristics. The CSF characteristics represent the relationship between the spatial frequency of the dot pattern and the contrast sensitivity of the human eye.

Fluctuation in printing density due to the dot pattern is easy to distinguish when the spatial frequency of the dot pattern is in a frequency band with increased contrast sensitivity of the human eye. In this case, dots tend to be easier to distinguish individually. Such an appearance is also referred to as being grainy.

Fluctuation in printing density due to the dot pattern is hard to distinguish when the spatial frequency of the dot pattern is in a frequency band with low contrast sensitivity of the human eye. In this case, the dot pattern tends to appear as a uniform-density solid pattern in which individual dots are not distinguishable. Such an appearance is also referred to as not being grainy or being slightly grainy. In general, fluctuation in printing density due to the dot pattern is easy to distinguish when the spatial frequency of the dot pattern is included in a predetermined frequency band. On the other hand, fluctuation in printing density due to the dot pattern is hard to distinguish when the spatial frequency of the dot pattern is not included in a predetermined frequency band, i.e. when the spatial frequency is included in a frequency band that is higher or lower than a predetermined frequency band.

The spatial frequency of the dot pattern may be calculated two-dimensionally for each of the X-direction and the Y-direction in FIG. 3, for example. The spatial frequency of the dot pattern may be calculated one-dimensionally for the dots in a certain row of the dot pattern. In the present embodiment, the spatial frequency relative to the X-direction array of the dot pattern is calculated using the average printing density of dots arrayed in the Y-direction in FIG. 3.

Figure 4:
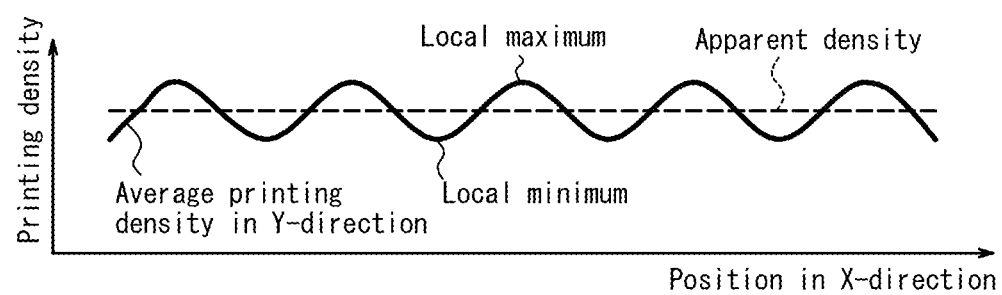
FIG. 4 is a graph illustrating the average printing density in the scanning direction of the dot pattern in FIG. 3.

As illustrated in FIG. 4, the average printing density in the Y-direction of the dot pattern in FIG. 3 changes in accordance with the position in the X-direction. The horizontal axis in FIG. 4 represents the position in the X-direction. The vertical axis represents the average printing density in the Y-direction. The printing density has a distribution corresponding to the dot array. The average printing density calculated along lines in the Y-direction traversing the center of dots corresponds to local maxima in the graph in FIG. 4. The lines traversing the center of dots in the Y-direction are indicated by dashed dotted lines in FIG. 3. On the other hand, the average printing density calculated along lines in the Y-direction traversing portions where no dots are printed corresponds to local minima in the graph in FIG. 4. The lines in the Y-direction traversing portions where no dots are printed are not illustrated in FIG. 3. In FIG. 3, portions where dots are not printed exist over a predetermined width in the X-direction. The average printing density of a portion where no dots are printed may be the same local minimum over the predetermined width. When the average printing density is the same local minimum over a predetermined width, the graph near the local minimum of the average printing density may become a straight line indicating a constant value. Depending on the actual resolution at which the reading apparatus 30 reads the printing result, the graph near the local minimum of the average printing density becomes a curve, as illustrated in FIG. 4.

The spatial frequency in the X-direction of the dot pattern in FIG. 3 is calculated by performing frequency spectrum analysis on the waveform of the average printing density illustrated in FIG. 4. When the calculated spatial frequency is included in a frequency band with high contrast sensitivity for the human eye in terms of CSF characteristics, the human eye can distinguish between dots corresponding to the local maxima and dots corresponding to the local minima of the average printing density in FIG. 4. In other words, each dot in the dot pattern in FIG. 3 is visibly distinguishable. When the calculated spatial frequency is included in a frequency band with low contrast sensitivity for the human eye in terms of CSF characteristics, the human eye can no longer distinguish between dots corresponding to the local maxima and dots corresponding to the local minima of the average printing density in FIG. 4. In this case, the dot pattern appears to be printed as a solid pattern with uniform printing density, like the apparent density indicated by the dashed line in FIG. 4.

The dot size and array spacing that determine the spatial frequency of the dot pattern may be changed by the printing apparatus 1 over a predetermined range. The dot size may, for example, be changed by controlling the amount of ink ejected from the printing elements 181. The dot spacing interval can be determined by the spacing interval of the printing elements 181 provided in the printhead 18. The dot spacing interval can also be changed by controlling the relative positions of the printhead 18 and the printing medium 20 in the array direction of the printing elements 181.

The printing apparatus 1 converts the input image data to output image data on the basis of the printing characteristics of the printing elements 181 to improve the degree of reproduction of the printing result relative to the input image data. When the number of gradations representable by dots printed by the printing elements 181 is smaller than the number of gradations of the input image data, the printing apparatus 1 generates output image data by color reduction that reduces the number of gradations. An error diffusion method or the like, for example, may be used for color reduction. The processing to generate the output image data is not limited to color reduction. The printing apparatus 1 may, for example, generate output image data that increases the printing speed. The printing speed can also be thought of as the number of dots printed per unit time. The printing apparatus 1 may generate the output image data in accordance with image conversion settings from the user, such as settings for brightness, saturation, or the like, or settings for image sharpness. The controller 10 may store the generated output image data in the memory 12.

When the image data targeted for color reduction is a monochrome image, the number of gradations in the density of black may be reduced. When the image data targeted for color reduction is a color image, the number of gradations in the density of each of the primary colors for printing, including colors such as cyan, magenta, and yellow, may be reduced.

Figure 5:
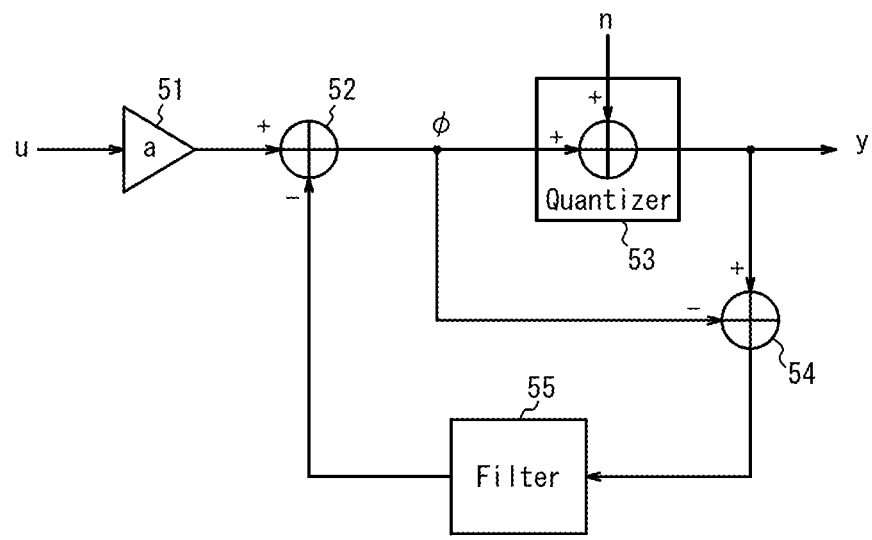
FIG. 5 is a block diagram illustrating an example of conversion of image data.

As illustrated in FIG. 5, the block that converts image data includes a multiplier 51, a first calculator 52, a quantizer 53, a second calculator 54, and a filter 55. The block that converts image data is also referred to as a conversion block. The first calculator 52 and the second calculator 54 may, for example, each be formed by adders. The functions of each component of the conversion block can be executed by the controller 10. The components of the conversion block can be implemented as discrete constituent elements.

The conversion block of the controller 10 sequentially converts the pixels of the input image data one pixel at a time into pixels of output image data. One pixel of input image data is represented as u. One pixel of input image data is also referred to below as input pixel data. One pixel of output image data is represented as y. One pixel of output image data is also referred to below as output pixel data. The controller 10 is assumed to convert pixels sequentially to the right from the pixel in the upper left corner of the input image data. After converting up to the pixel at the right edge, the controller 10 converts the pixels one row lower from left to right. The controller 10 converts pixels sequentially until converting the pixel in the lower right corner. The controller 10 may convert pixels in a different order.

The multiplier 51 multiplies the input pixel data by a predetermined coefficient and outputs the result. The predetermined coefficient is represented as a. The predetermined coefficient is also referred to as correction gain and is a positive real number. The correction gain is determined by the below-described density distribution correction.

The first calculator 52 outputs the difference between the output of the multiplier 51 and the output of the filter 55. The output of the filter 55 is data that provides feedback on the quantization error generated by color reduction, with an error diffusion method or the like, of other input pixel data processed before the input pixel data inputted to the multiplier 51. The output of the first calculator 52 becomes data that includes the quantization error generated in other input pixel data. The output of the first calculator 52 is represented as φ.

The quantizer 53 receives the output (φ) of the first calculator 52 as an input value and outputs an output value yielded by quantizing the output (φ). In other words, the quantizer 53 adds a quantization error (n) to the output (φ) and outputs the result as output pixel data.

Figure 6:
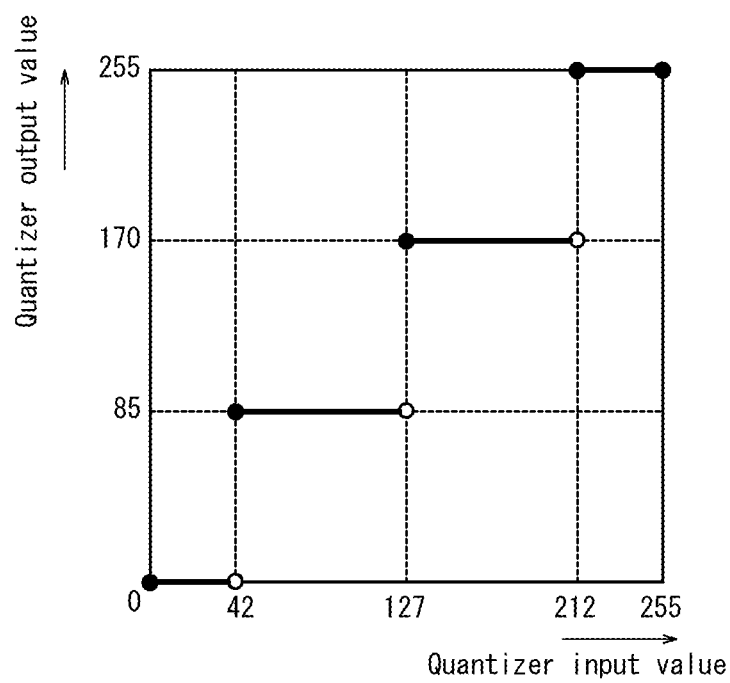
FIG. 6 is a graph illustrating an example relationship between input values and output values of a quantizer.

On the basis of the relationship between input values and output values illustrated in the graph in FIG. 6, for example, the quantizer 53 converts an input value to an output value. In FIG. 6, the relationship between input values and output values is indicated by bold lines. The output value of the quantizer 53 for an input value of at least 0 and less than 42 is, for example, 0. The output value of the quantizer 53 for an input value of at least 42 and less than 127 is, for example, 85. The output value of the quantizer 53 for an input value of at least 127 and less than 212 is, for example, 170. The output value of the quantizer 53 for an input value of at least 212 and 255 or less is, for example, 255.

According to the example relationship in FIG. 6, the output value of the quantizer 53 is 85 for an input value of 100, for example. In this case, the quantization error is −15.

The second calculator 54 outputs the difference between the output (y) of the quantizer 53 and the output (φ) of the first calculator 52. The output of the second calculator 54 corresponds to the quantization error generated when φ was quantized.

The filter 55 diffuses the quantization error, generated when φ was quantized, to other pixels. The circuit including the filter 55 provides feedback on the conversion result for a certain pixel to conversion of other pixels.

Figure 7:
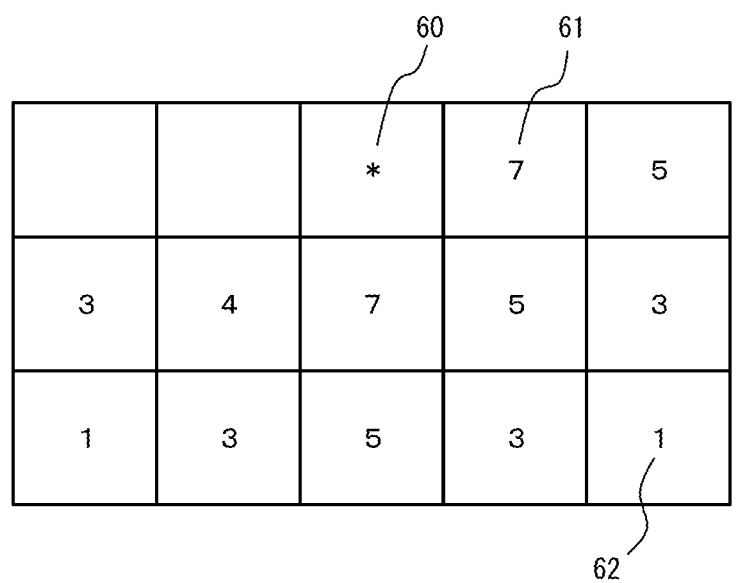
FIG. 7 illustrates an example diffusion matrix.

The filter 55 uses a diffusion matrix, for example, to diffuse the quantization error to pixels surrounding the pixel for which the quantization error was generated. As illustrated in FIG. 7, the diffusion matrix may have a plurality of cells. The arrangement of cells in the diffusion matrix corresponds to the arrangement of pixels in the image data. In the diffusion matrix of FIG. 7, the cell indicated by an asterisk (*) is a diffusion source cell 60 corresponding to a pixel that is the diffusion source of quantization error. The pixel that becomes the diffusion source of quantization error is also referred to as a diffusion source pixel. The adjacent cell to the right of the diffusion source cell 60 corresponds to the adjacent pixel to the right of the diffusion source pixel. The number of cells forming the diffusion matrix is not limited to a total of three rows by five columns as in FIG. 7. The cells may be in two or fewer rows, or four or more rows. The cells may be in four or fewer columns, or six or more columns. The arrangement of cells is not limited to a matrix. The cells may be arranged in any way, such as stepwise or as an inverted pyramid.

The numerical values indicated in the cells of the diffusion matrix are weights used when diffusing error. In the diffusion matrix in FIG. 7, a weight is given to each cell. The cells that have already been converted to the left of the diffusion source cell 60 are not given weights. The filter 55 allocates the quantization error of the diffusion source pixel to the cells in proportion to the weights given to the cells. In other words, the quantization error of the diffusion source pixel is allocated to the cells in accordance with the ratio between the weight given to each cell and the sum of the weights.

In the example in FIG. 7, the sum of the 12 weights is 47. The cell to the right of the diffusion source cell 60 is given a weight of 7. The cell to the right of the diffusion source cell 60 is also referred to as a first diffusion target cell 61. The filter 55 allocates 7/47 of the quantization error of the diffusion source pixel to the first diffusion target cell 61. The cell two cells to the right and two cells below the diffusion source cell 60 is given a weight of 1. The cell two cells to the right and two cells below the diffusion source cell 60 is also referred to as a second diffusion target cell 62. The filter 55 allocates 1/47 of the quantization error to the second diffusion target cell 62. The filter 55 allocates the quantization error similarly to the other cells. With this approach, the sum of the quantization error allocated to the cells in the diffusion matrix is equal to the quantization error of the diffusion source pixel.

When a cell has no corresponding pixel, the quantization error allocated to that cell need not be provided as feedback to the conversion of the input pixel data. The case of a cell having no corresponding pixel includes, for example, the diffusion source pixel being a pixel in the bottom row.

When a cell has no corresponding pixel, the filter 55 may be configured not to allocate the quantization error to the cell. The quantization error allocated to other cells in this case may become relatively large.

The processing by the filter 55 allocates a quantization error to each pixel from a plurality of diffusion source pixels. For each pixel, the filter 55 accumulates and stores the quantization error allocated to the pixel from the plurality of diffusion source pixels. The filter 55 may store the quantization error allocated to each pixel in the memory 12. The filter 55 outputs, to the first calculator 52, the quantization error allocated to the pixel that is input to the first calculator 52 for conversion.

Figure 8:
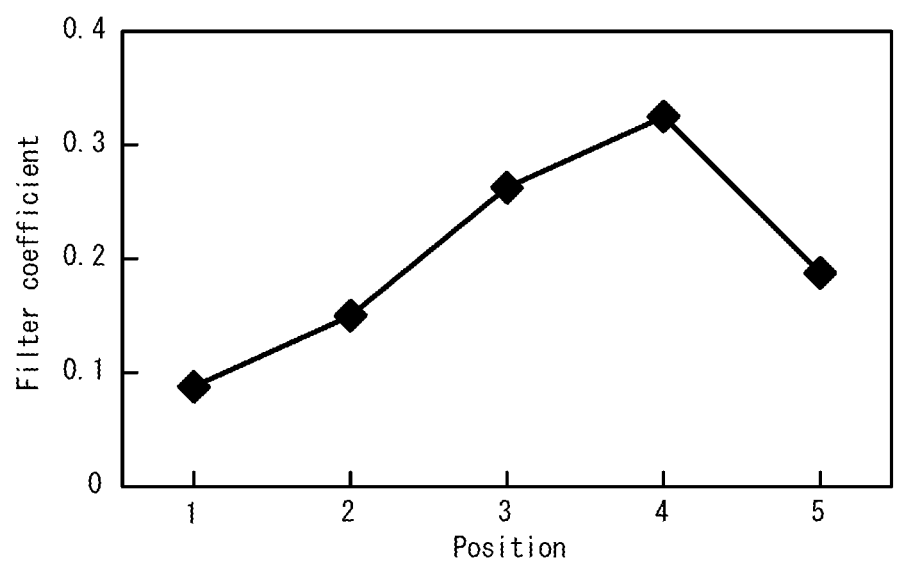
FIG. 8 is a graph illustrating a filter coefficient of a diffusion filter corresponding to FIG. 7.

The filter 55 can also be implemented by applying a diffusion filter to the image data. The diffusion matrix in FIG. 7 is associated with a diffusion filter having the filter characteristics illustrated in FIG. 8. In FIG. 8, the horizontal axis represents the horizontal position of the pixel to be handled during conversion, and the vertical axis represents the filter coefficient corresponding to each position. Position 3 on the horizontal axis corresponds to the third column that includes the diffusion source cell 60 in the diffusion matrix. Position 1 corresponds to the first column located furthest to the left in the diffusion matrix. Similarly, positions 2, 4, and 5 respectively correspond to the second, fourth, and fifth columns of the diffusion matrix.

The quantization error of the diffusion source pixel is diffused to the first through fifth columns in accordance with the filter characteristics illustrated in FIG. 8. As illustrated in FIG. 8, the quantization error of the diffusion source pixel is diffused more to the fourth column than to the third column. In other words, the diffusion target of the quantization error is shifted to the column on the right. The quantization error diffused to the first or fifth columns is relatively small.

Diffusing the quantization error to surrounding pixels can be thought of as cutting the high-frequency component of the spatial frequency spectrum of the image data. In other words, the diffusion filter has frequency characteristics that allow a low-frequency component to pass. Such frequency characteristics that allow a low-frequency component to pass can be considered the characteristics of a low pass filter (LPF). The image data processed by the diffusion filter is made up of frequency components that include a frequency band with low contrast sensitivity in terms of CSF characteristics. This approach makes fluctuation in the printing density less noticeable to the human eye, even for color-reduced image data.

Figure 9A:
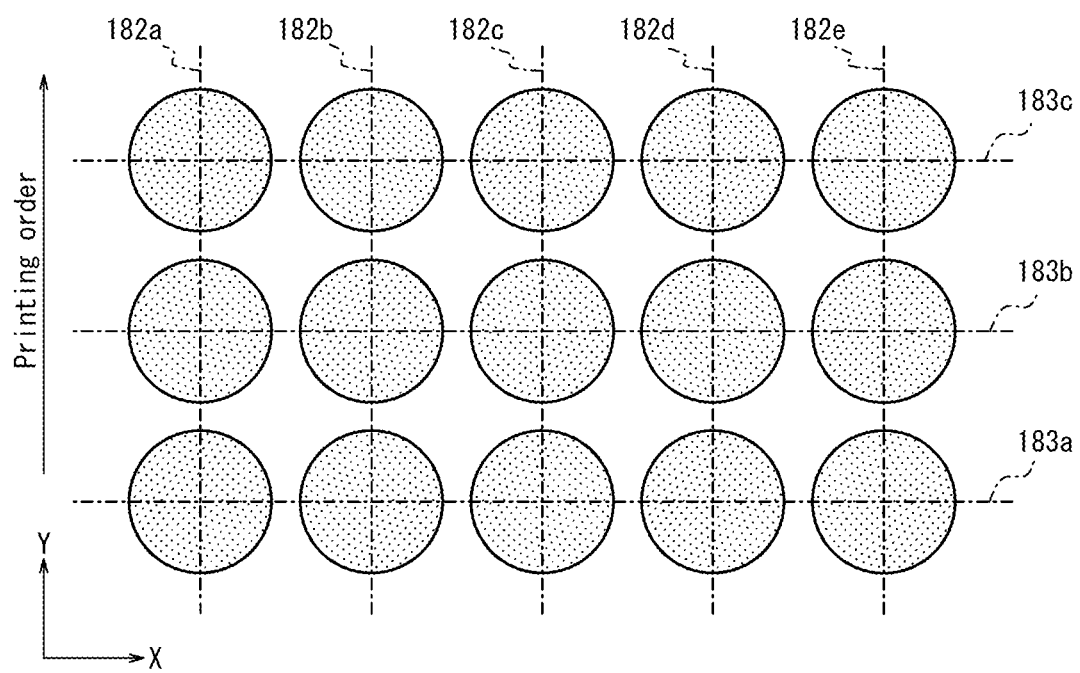
FIG. 9A illustrates an example dot pattern printed when printing elements have uniform printing characteristics.

The printing apparatus 1 can drive the plurality of printing elements 181 of the printhead 18 in parallel. For example, the printing apparatus 1 can drive five printing elements 181 arrayed in a line (see FIG. 2A) in parallel to print five dots simultaneously. The printing apparatus 1 can drive the printing elements 181 while scanning the printhead 18 over the printing medium 20 to sequentially print lines of dots. For example, when the printing elements 181 are driven three times, a 3×5 dot pattern such as the example in FIG. 9A is printed. This allows the printing apparatus 1 to increase the printing speed.

In FIG. 9A, the direction in which five dots are aligned is assumed to be the X-direction. The direction in which three dots are aligned is assumed to be the Y-direction. The X-direction corresponds to the longitudinal direction of the printhead 18. In other words, the X-direction corresponds to the array direction of the printing elements 181. The Y-direction corresponds to the direction in which the printhead 18 is scanned over the printing medium 20. In other words, the Y-direction corresponds to the scanning direction of the printhead 18.

In the present embodiment, the dots are sequentially printed from bottom to top in the Y-direction. The dots may be sequentially printed from top to bottom. The rows and columns of the dot pattern may be interchanged. The dots may be printed in any of various orders other than the ones described above. The number of printing elements 181 is not limited to five. Four or fewer, or six or more, printing elements 181 may be included.

In FIG. 9A, scanning lines 182*a* to 182*e* indicating the scanning direction are indicated by dashed dotted lines in the Y-direction. The scanning lines 182*a* to 182*e* are also referred to as scanning lines 182. The dots printed along the scanning line 182*a* are printed by the printing element 181*a*. The dots printed along each of the scanning lines 182*b* to 182*e* are respectively printed by the printing elements 181*b* to 181*e*.

In FIG. 9A, printing lines 183*a* to 183*c* are indicated by dashed lines. The printing lines 183*a* to 183*c* are also referred to as printing lines 183. The printing lines 183 are targets for matching the position between the printhead 18 and the printing medium 20. The printing apparatus 1 prints dots at the intersections between the scanning lines 182 and the printing lines 183.

The dots in the example in FIG. 9A have uniform size and are printed without deviating from the intersections between the scanning lines 182 and the printing lines 183. On the basis of uniform input image data, this type of dot pattern can be printed by printing elements 181 having uniform printing characteristics.

Figure 9B:
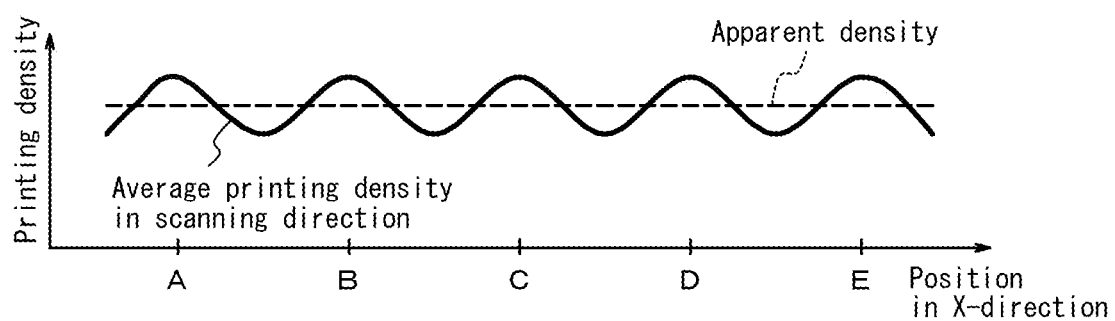
FIG. 9B is a graph of the printing density distribution of the dot pattern in FIG. 9A.

FIG. 9B is a graph plotting the average printing density in the scanning direction calculated over paths along the scanning direction (Y-direction) of the printhead 18 for the dot pattern in FIG. 9A. The horizontal axis represents the position in the X-direction. The vertical axis represents the printing density. Points A to E on the horizontal axis respectively correspond to positions in the X-direction of the scanning lines 182*a* to 182*e*. For example, the average printing density in the scanning direction at point A is calculated over the path of the scanning line 182*a*.

The spatial frequency in the X-direction of the dot pattern in FIG. 9A is calculated by performing frequency spectrum analysis on the waveform of FIG. 9B. The spatial frequency spectrum in the X-direction of the dot pattern in FIG. 9A is, for example, mainly made up of a frequency component determined using the interval of the scanning lines 182 as the period and overall is included in a frequency band with lower contrast sensitivity of the human eye in terms of CSF characteristics. In this case, the dot pattern in FIG. 9A appears to be a uniform-density solid pattern in the X-direction, like the apparent density indicated by the dashed line in FIG. 9B. When the frequency determined using the interval of the printing lines 183 as the period is included in a frequency band with lower contrast sensitivity of the human eye, the dot pattern appears to be a uniform-density solid pattern in the Y-direction.

The correction data included in the printing characteristics of each printing element 181 may vary for numerous reasons. For example, the printing elements 181 may produce variation in the printing positions of dots due to error in the array positions of the printing elements 181. The printing density may also vary due to variation in the dot size caused by variation in the amount of ink in a drop. The causes for variation in the correction data are not limited to the above examples.

Figure 10A:
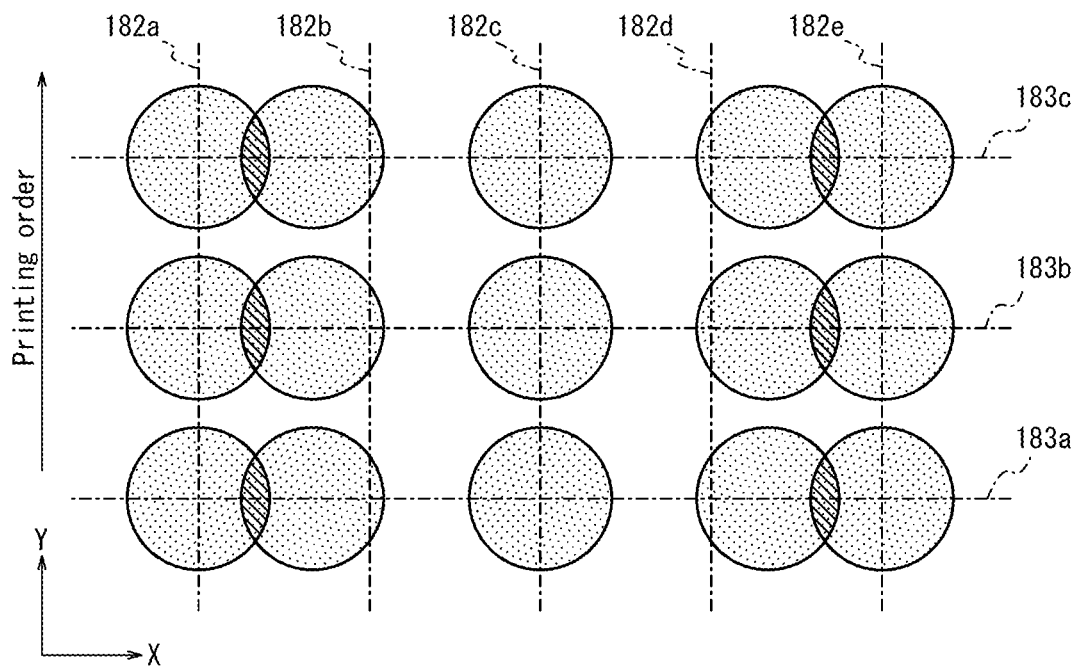
FIG. 10A illustrates an example dot pattern printed when printing elements exhibit variation in printing characteristics.

When there is variation in the correction data of the printing elements 181, there may be variation in the printing result. Even when printing is based on uniform input image data, the printing positions of the printed dots will not be uniform, as in the example in FIG. 10A, if the correction data pertaining to the printing positions of dots varies between printing elements 181, for example. The printing positions of dots in FIG. 10A are shifted to the left by the scanning line 182*b* to be closer to the scanning line 182*a*, and shifted to the right by the scanning line 182*d* to be closer to the scanning line 182*e*. In other words, the printing result in the example in FIG. 10A appears to have streaks along the scanning direction.

Figure 10B:
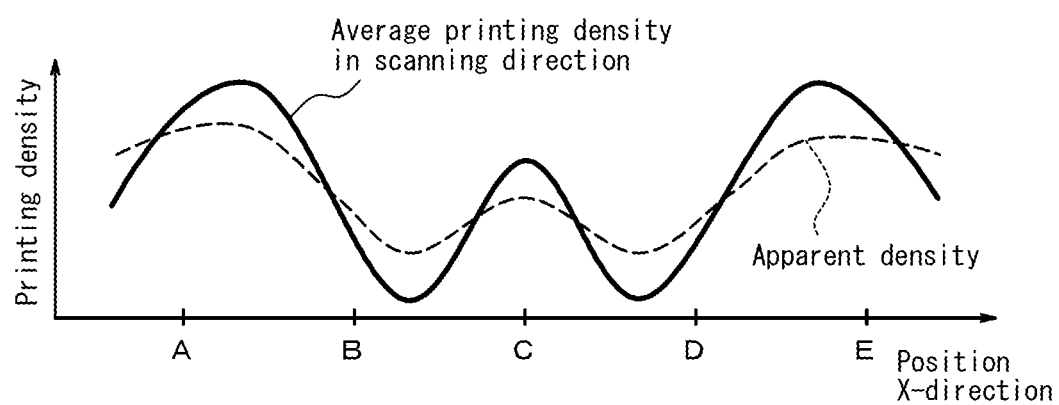
FIG. 10B is a graph of the printing density distribution of the dot pattern in FIG. 10A.

The variation in correction data pertaining to the printing positions of dots is, for example, evaluated using the average printing density in the scanning direction calculated over a path along the scanning direction indicated by the scanning lines 182. FIG. 10B is a graph plotting the average printing density in the scanning direction calculated for paths along the scanning direction (Y-direction) of the printhead 18 for the example dot pattern in FIG. 10A. The horizontal and vertical axes are the same as in FIG. 9B.

The spatial frequency in the X-direction of the dot pattern in FIG. 10A is calculated by performing frequency spectrum analysis on the waveform of FIG. 10B. The spatial frequency spectrum in the X-direction of the dot pattern in FIG. 10A includes a frequency component determined using the interval of the scanning lines 182 as the period and a frequency component determined by the fluctuation resulting from variation in the printing positions of dots printed on each scanning line 182. As in FIG. 9B, the frequency component determined using the interval of the scanning lines 182 as the period is included in a frequency band with lower contrast sensitivity of the human eye in terms of CSF characteristics. On the other hand, the frequency component determined by the fluctuation resulting from variation in the printing positions of dots is assumed to be included in a frequency band in which the contrast sensitivity is higher. In this case, the dot pattern in FIG. 10A appears to be a pattern with a density distribution in the X-direction like the apparent density indicated by the dashed line in FIG. 10B. In other words, the example dot pattern in FIG. 10A appears to have a relatively high density at point A and point E and a relatively low density at point B and point D in the X-direction. The dot pattern in FIG. 10A appears to have low-density streaks at positions along the scanning direction corresponding to positions between point B and point C and between point C and point D. The dot pattern in FIG. 10A appears to have high-density streaks at positions along the scanning direction corresponding to positions between point A and point B and between point D and point E.

In FIG. 9B and FIG. 10B, the apparent density indicated by the dashed line can be calculated by applying an LPF to the average printing density in the scanning direction indicated by the solid line, the LPF having frequency characteristics that take CSF characteristics into account. The application of an LPF to the average printing density in the scanning direction can remove the noise component included in the average printing density in the scanning direction.

The apparent density can also be calculated by calculating a moving average over set predetermined sections of the average printing density in the scanning direction. The predetermined sections are, for example, set to the intervals of the scanning lines 182. Calculating a moving average of the average printing density in the scanning direction can also remove the noise component included in the average printing density in the scanning direction.

The example of the average printing density in the scanning direction in FIG. 10B may, for example, be acquired from the printing result of input image data that is predicted to appear as having uniform density. The input image data for which the printing result is predicted to appear as having uniform density is, for example, test pattern data that includes a uniform array of pixels. The printing apparatus 1 causes the reading apparatus 30 to read the printing result that was printed on the printing medium 20 on the basis of input image data including a uniform array of pixels. The printing apparatus 1 can calculate the average printing density in the scanning direction from the reading result acquired from the reading apparatus 30. The printing density thus measured from the actual printing result is also referred to as the measured printing density. The printing apparatus 1 may predict the printing density of the printing result on the printing medium 20 on the basis of the printing characteristics of each printing element 181 and the input image data. The printing density thus predicted is also referred to as the predicted printing density.

When the printing result differs from the result predicted from the input image data, the controller 10 of the printing apparatus 1 can include data for correcting the printing result in control information generated for the printing elements 181. The printing result may be the measured printing density or the predicted printing density. The measured printing density or the predicted printing density is also referred to as the pre-correction printing density. The case of the printing result differing from the result predicted from the input image data may, for example, correspond to the printing result being predicted to appear as a uniform-density solid pattern but not appearing so, as in FIG. 10B.

When the printing result differs from the predicted result due to the printing characteristics pertaining to the printing positions of the dots, the controller 10 may generate control information for the printing elements 181 on the basis of the correction data pertaining to the printing positions of the dots of the printing elements 181. In this case, the controller 10 may set a correction gain as the predetermined coefficient (a) of the multiplier 51 in the conversion block of FIG. 5. The correction gain set during the conversion of a pixel printed by a printing element 181 is also referred to as the correction gain of the printing element 181.

In FIG. 10A, the dots along the scanning line 182b printed by the printing element 181b are shifted to the left, closer to the scanning line 182a. Consequently, in FIG. 10B, the apparent density at point A becomes relatively higher. The apparent density at point B becomes relatively lower. For the printing result to appear to the human eye to have uniform density, the printing apparatus 1 may generate control information to cause the printing element 181b or printing element 181c to print a larger sized dot than the dot based on the input pixel data. In this case, the printing apparatus 1 generates output pixel data of the pixel corresponding to the printing element 181b or printing element 181c after setting the correction gain to a >1 when the input pixel data of the pixel corresponding to the printing element 181b or printing element 181c is input into the multiplier 51. The printing apparatus 1 may generate control information to cause the printing element 181a to print a smaller sized dot than the dot based on the input pixel data. In this case, the printing apparatus 1 generates output pixel data of the pixel corresponding to the printing element 181a after setting the correction gain to a <1 when the input pixel data of the pixel corresponding to the printing element 181a is input into the multiplier 51.

In FIG. 10A, the dots along the scanning line 182d printed by the printing element 181d are shifted to the right, closer to the scanning line 182e. Consequently, in FIG. 10B, the apparent density at point E becomes relatively higher. The apparent density at point D becomes relatively lower. For the printing result to appear to the human eye to have uniform density, the printing apparatus 1 may generate control information to cause the printing element 181c or printing element 181d to print a larger sized dot than the dot based on the input pixel data. In this case, the printing apparatus 1 generates output pixel data of the pixel corresponding to the printing element 181c or printing element 181d after setting the correction gain to a >1 when the input pixel data of the pixel corresponding to the printing element 181c or printing element 181d is input into the multiplier 51. The printing apparatus 1 may generate control information to cause the printing element 181e to print a smaller sized dot than the dot based on the input pixel data. In this case, the printing apparatus 1 generates output pixel data of the pixel corresponding to the printing element 181e after setting the correction gain to a <1 when the input pixel data of the pixel corresponding to the printing element 181e is input into the multiplier 51. As in the example above, the method of setting the correction gain may thus be based on the printing density resulting from a shift in the printing positions of dots.

In the present embodiment, the correction gain is set in accordance with a target value of the printing density to be obtained after correction. The target value of the printing density is also referred to as the target density. The target density may be the printing density when there is no difference between the printing result predicted on the basis of the control information for the printing elements 181 and the actual printing result of the printing elements 181. The target density may be the average printing density in the scanning direction, or the average apparent density, at each position in the X-direction. The target density may be set to a value corresponding to the maximum or minimum of the average printing density in the scanning direction or the apparent density. The target density may be set to a value equal to or greater than the maximum of the apparent density. The target density may be any value other than the above-described values.

Figure 11:
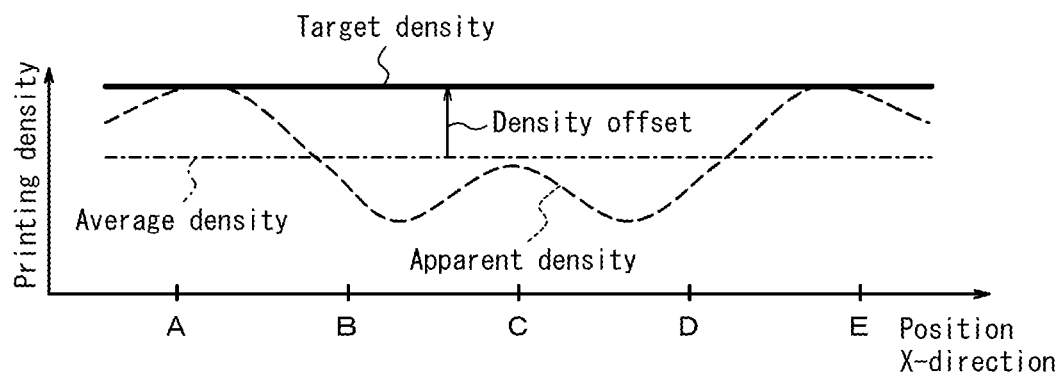
FIG. 11 is a graph illustrating an example setting of the target density of the printing apparatus according to the first embodiment.

In the present embodiment, the target density is set to a value yielded by adding a density offset to the average density obtained by averaging the apparent density at each position in the X-direction, as illustrated in FIG. 11, for example. Adding the density offset to the target density is also referred to as offsetting the target density. In FIG. 11, the target density is indicated by a solid line, the average density by a dashed dotted line, and the apparent density by a dashed line. The density offset may be calculated as the maximum of the difference between the average density and the apparent density before averaging. The target density set in this way becomes equal to or greater than the apparent density at every position in the X-direction. The density offset may be set to the amplitude of the waveform yielded by the difference between the waveform of the average density and the waveform of the apparent density before averaging.

Calculating the apparent density by applying an LPF to the average printing density in the scanning direction can be considered a type of averaging. Calculating the average printing density in the scanning direction from the pre-correction printing density can also be considered a type of averaging. Calculating the average density from the apparent density can also be considered a type of averaging. In other words, the average density can be calculated by averaging the pre-correction printing density.

When the target density is set as illustrated in FIG. 11, the apparent density at point B, for example, is lower than the target density. In this case, the printing apparatus 1 sets the correction gain for generating the output pixel data for the printing element 181b corresponding to point B to a value greater than 1. The printing apparatus 1 also sets the correction gain to a value greater than 1 for points C and D, where the apparent density is lower than the target density, like point B. On the other hand, the apparent density at point A is substantially equal to the target density. In this case, the printing apparatus 1 sets the correction gain for generating the output pixel data for the printing element 181a corresponding to point A to 1. The printing apparatus 1 also sets the correction gain to 1 for point E, where the apparent density is substantially equal to the target density, like point A.

Figure 12:
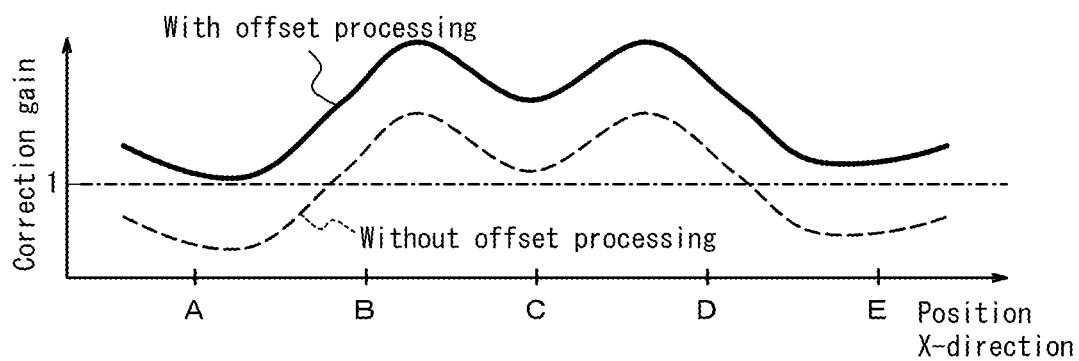
FIG. 12 is a graph illustrating an example setting of correction gain.

The correction gain can be set as illustrated in FIG. 12. The horizontal axis of the graph in FIG. 12 represents the position in the X-direction. The vertical axis of the graph in FIG. 12 represents the correction gain. The line where the correction gain is 1 is indicated by the dashed dotted line. The example of setting the correction gain corresponding to the target density in FIG. 11 is indicated by a solid line for the case of an offset. In this case, the correction gain is set to a value of 1 or greater at every position in the X-direction.

In the present embodiment, the correction gain is assumed to be set to a value of 1 or greater for the printing elements 181 corresponding to every position in the X-direction. This approach makes it possible for the size of the dots printed by the printing elements 181 not to be smaller than in the case of no correction.

Figure 13:
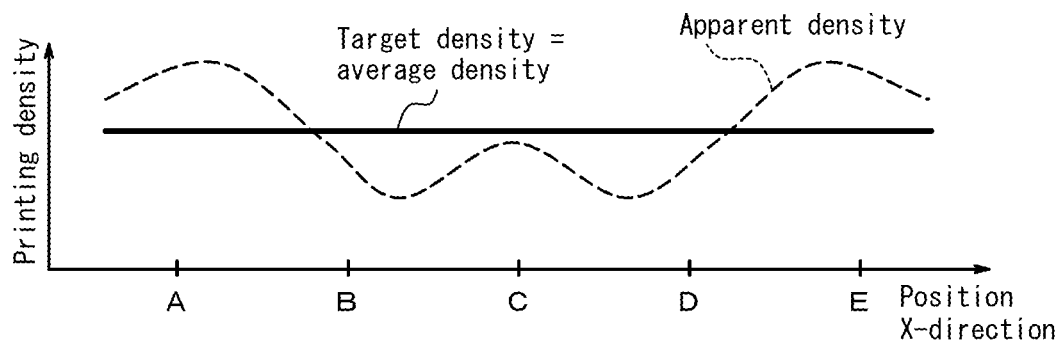
FIG. 13 is a graph illustrating an example setting of the target density of an apparatus according to a comparative example.

An apparatus according to a comparative example sets the target density to the average density, as illustrated in FIG. 13. In this case, the apparent density at point B, for example, is lower than the target density. The apparatus of the comparative example sets the correction gain of the printing element 181b to a value greater than 1 in this case. On the other hand, the apparent density at point A is higher than the target density. The apparatus of the comparative example sets the correction gain of the printing element 181a to a value less than 1 in this case.

The correction gain set in correspondence with the target density illustrated in FIG. 13 is indicated in FIG. 12 by a dashed line as the case of no offset. In this case, the correction gain is greater or less than 1 depending on the position in the X-direction. In the comparative example, the correction gain is set to a value less than 1 for at least a portion of the printing elements 181.

When the correction gain corresponding to a printing element 181 is set to a value less than 1, the size of the dot printed by the printing element 181 may be smaller than in the case of no correction. When the dot size becomes smaller, the space from an adjacent printed dot increases. The dot pattern printed in this way may have a high contrast sensitivity. Consequently, the printing result tends to become grainy.

As described above, the printing apparatus 1 according to the present embodiment can generate output image data that is corrected so that the printing result has less of a tendency to appear grainy than with the apparatus of the comparative example.

An example of the image correction method executed by the printing apparatus 1 of the present embodiment is described with reference to the flowchart in FIG. 14.

The controller 10 of the printing apparatus 1 prints a test pattern on the printing medium 20 (step S1). Information pertaining to the printing characteristics of each printing element 181 is included in the printing result of the test pattern.

The controller 10 acquires the density distribution in the printing result of the test pattern from the reading apparatus 30 (step S2). The reading apparatus 30 reads the density distribution in the printing result of the test pattern from the printing medium 20 and outputs the density distribution to the controller 10. The controller 10 may store the acquired density distribution in the memory 12.

The controller 10 averages the density distribution (step S3). The density distribution is, for example, represented as the average printing density in the scanning direction illustrated in FIG. 10B. The average printing density in the scanning direction is represented as a composite waveform of the fluctuating component resulting from variation in the size of dots printed by the scanning lines 182 and the fluctuating component having the interval of the scanning lines 182 as the period. The controller 10 analyzes the spatial frequency spectrum in the X-direction for the average printing density in the scanning direction in FIG. 10B and then calculates the apparent density by filtering based on CSF characteristics. The filtering based on CSF characteristics is a type of averaging. The controller 10 averages the apparent density to calculate the average density. The averaging of the apparent density may, for example, simply be a calculation of the average of the apparent density at each position in the X-direction. The averaging of the apparent density may be a calculation of a moving average using predetermined sections. The predetermined sections may be selected appropriately. A non-limiting example is the intervals of the scanning lines 182. The averaging of the apparent density may use a different averaging algorithm.

The controller 10 adds a density offset to the average density to calculate the target density (step S4). The density offset is, for example, set to a predetermined value. In this case, the target density is calculated by adding the predetermined value to the average density corresponding to each position in the X-direction, as illustrated in FIG. 11. The predetermined value is set so that the target density is equal to or greater than the apparent density.

The controller 10 calculates the correction gain of each printing element 181 (step S5). When the apparent density and the target density have a relationship such as the one in FIG. 11, then the correction gain of the printing element 181b corresponding to point B, for example, is set to a value greater than 1. The correction gain of the printing element 181a corresponding to point A, for example, is set to 1. The relationship between the correction gains of the printing elements 181a to 181e corresponding to points A to E is as follows: (point B, point D)>(point C)>(point A, point E). When the correction gain of the printing elements 181a and 181e is set to 1, the correction gain of each printing element 181 is set to at least 1.

Figure 14:
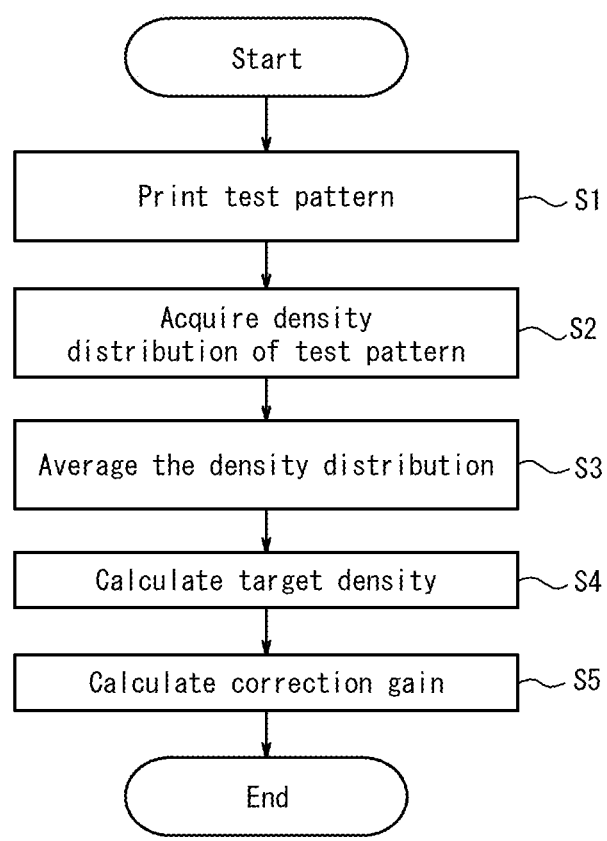
FIG. 14 is a flowchart illustrating an example image correction method according to the first embodiment.

After step S5, the controller 10 ends the procedure of the flowchart in FIG. 14. The controller 10 applies the correction gain of each printing element 181 calculated with the procedure of the flowchart in FIG. 14 to the multiplier 51 of the conversion block in FIG. 5. Application of the correction gain to the generation of the output pixel data allows the output pixel data to be corrected in accordance with the printing characteristics of the printing elements 181.

As described above, the printing apparatus 1 and printing correction method according to the present embodiment set the correction gain of each printing element 181 to at least 1. This makes the printing result obtained after application of the correction gain less prone to graininess.

Second Embodiment

A diffusion filter having the properties of an LPF can be used in color reduction that is based on the error diffusion method in the first embodiment. In the second embodiment, an LPF that takes into account the size of the diffusion filter used in the error diffusion method can be applied to the waveform of the pre-correction printing density.

The size of the diffusion filter can be indicated by the range over which the diffusion filter has an effect. The example diffusion filter in FIG. 8 has an effect from position 1 to position 5. The size of the example diffusion filter in FIG. 8 can be considered to be five pixels in the X-direction.

An LPF that takes into account the size of the diffusion filter can be thought of as being designed to have an effect over the same range as a diffusion filter. In the present embodiment, the LPF is assumed to take into account the size of the diffusion filter in FIG. 8. The LPF is designed to affect five pixels in the X-direction when applied to the waveform of the pre-correction printing density.

Figure 15:
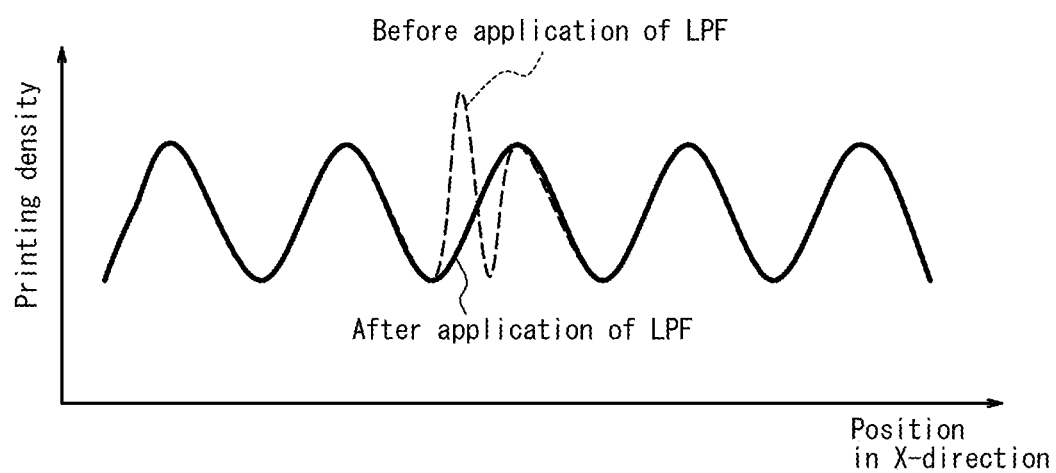
FIG. 15 is a graph illustrating an example of applying an LPF to the waveform of the pre-correction printing density.

As an example, the case of a high-frequency noise component being included in the waveform of the pre-correction printing density, indicated by the dashed line in FIG. 15, is described. When an LPF that takes into account the size of the diffusion filter is applied to a waveform that includes a high-frequency noise component, then the high-frequency noise component is removed from the waveform of the pre-correction printing density by application of the LPF.

For example, when a high-frequency noise component having a larger amplitude than the waveform of the pre-correction printing density is overlaid on the waveform of the pre-correction printing density, then the high-frequency noise component affects the averaging of the pre-correction printing density. The density offset can become a larger value than when no high-frequency noise component is present. The density offset can be kept lower by removal of the high-frequency noise component from the waveform of the pre-correction printing density.

The printing apparatus 1 according to the present embodiment can remove the high-frequency noise component by applying, to the waveform of the pre-correction printing density, an LPF that takes into account the size of the diffusion filter. The printing apparatus 1 according to the present embodiment can keep the density offset lower than when the density offset is set as in the first embodiment.

By applying an LPF that takes into account the size of the diffusion filter, the printing apparatus 1 according to the present embodiment can limit the scope of application of the LPF that leads to a reduction in the sharpness of the output image data. Consequently, a reduction in sharpness can be suppressed.

Third Embodiment

The correction gain applied in the multiplier 51 of the conversion block in FIG. 5 can be treated as having a spatial distribution corresponding to each pixel. In this case, an LPF that takes into account the size of the diffusion filter can be applied not only to the waveform of the pre-correction printing density but also to the waveform indicating the spatial distribution of the correction gain. With this approach, the noise component can be removed from the correction gain even after the correction gain has been calculated with the noise component remaining in the waveform of the pre-correction printing density.

Figure 16:
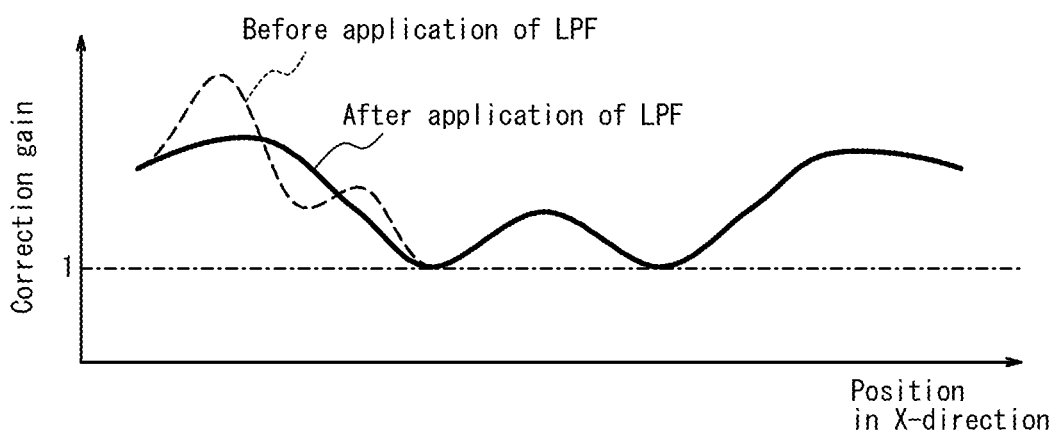
FIG. 16 is a graph illustrating an example of applying an LPF to a waveform indicating the spatial distribution of correction gain.

As illustrated in FIG. 16, for example, the correction gain can be represented as a waveform having a spatial distribution in the X-direction. The waveform indicated by the dashed line is an example of a waveform that includes a noise component and has not yet been processed by an LPF. The noise component can affect the correction gain that is applied to the multiplier 51 of the conversion block in FIG. 5 and the output pixel data generated by the conversion block. On the other hand, the waveform indicated by the solid line is an example of a waveform from which the noise component has been removed by application of the LPF. The removal of the noise component can suppress the effect on the output pixel data generated by the conversion block.

The printing apparatus 1 according to the present embodiment is assumed to treat the correction gain, applied to the generation of output pixel data by the conversion block, as having a spatial distribution corresponding to each pixel. An LPF that takes into account the size of the diffusion filter is assumed to be applied in the printing apparatus 1 according to the present embodiment. This allows the printing apparatus 1 according to the present embodiment to remove the noise component from the correction gain. Consequently, the density offset can be kept even lower.

By applying an LPF that takes into account the size of the diffusion filter, the printing apparatus 1 according to the present embodiment can limit the scope of application of the LPF that leads to a reduction in the sharpness of the output image data. Consequently, a reduction in sharpness can be suppressed.

Even when the correction gain is applied to conversion based on the error diffusion method, the correction gain is not applied to a high-frequency component at or above the cutoff frequency of the filtering for error diffusion. Consequently, the application of an LPF to the correction gain tends not to affect conversion.

Fourth Embodiment

In the first embodiment, the correction gain can be set to resolve the distribution of the printing density resulting from a shift in the printing positions of dots printed by the printing elements 181. Several methods may be used to select the printing elements 181 for which the correction gain is set.

For the dot pattern illustrated in FIG. 10B, for example, the printing apparatus 1 may increase the weight of the correction gain set for the printing element 181c to resolve the low printing density portion distributed in the scanning direction between point B and point C in FIG. 10B. Alternatively, the printing apparatus 1 may increase the weight of the correction gain of the printing element 181b.

In the conversion block of FIG. 5, the filter 55 can be implemented by applying a diffusion filter to the image data. In the second and third embodiments, an LPF that takes into account the size of the diffusion filter can be applied to the waveform of the pre-correction printing density or the waveform indicating the spatial distribution of the correction gain. Like a diffusion filter, the LPF includes filter coefficients that correspond to the horizontal positions of pixels in the image data.

Figure 17:
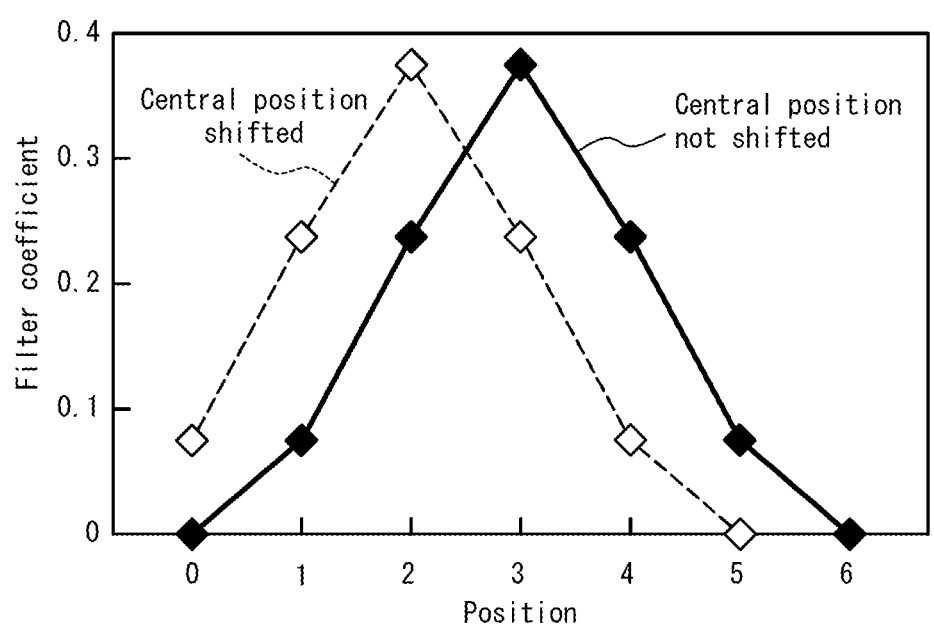
FIG. 17 is a graph illustrating an example of the filter coefficient of an LPF.

An example of the distribution of the filter coefficients of the LPF is illustrated in FIG. 17. In FIG. 17, the horizontal axis represents the horizontal position of the pixel to be handled during conversion. The vertical axis indicates the filter coefficient corresponding to each position. The distribution of the filter coefficients of the LPF is such that the filter coefficients have a local maximum at the central position in the horizontal direction, as illustrated by the solid rhombi and the solid line in FIG. 17, for example. The filter coefficients with a local maximum at the central position are also referred to as filter coefficients with an unshifted central position. An LPF that has filter coefficients with an unshifted central position tends not to affect the horizontal distribution of the data for each pixel when the LPF is applied to image data.

The distribution of filter coefficients of the LPF may be such that the position at which the filter coefficients have a local maximum is shifted to the left, as illustrated by the empty rhombi and the dashed line in FIG. 17. The filter coefficients with a local maximum at a position shifted from the central position are also referred to as filter coefficients with a shifted central position. An LPF that has filter coefficients with a shifted central position may affect the horizontal distribution of the data for each pixel when the LPF is applied to image data. For example, when an LPF that has filter coefficients with a shifted central position, as illustrated in FIG. 17, is applied to the waveform of the pre-correction printing density, the LPF shifts the entire waveform to the left. The waveform of the spatial distribution of the correction gain is shifted to the left in accordance with the shift to the left in the waveform of the pre-correction printing density. In other words, the application position of the correction gain is shifted to the left. The application position of the correction gain is also similarly shifted to the left when the LPF that has filter coefficients with a shifted central position is applied to the waveform indicating the spatial distribution of the correction gain.

In the example in FIG. 10A and FIG. 10B, an LPF that has filter coefficients with the central position shifted to the left, as illustrated in FIG. 17, can be applied to the image data. The correction gain for resolving the distribution of the printing density between point B and point C may be set to increase the weight for the printing element 181b or to increase the weight for the printing element 181c. When the application position of the correction gain is shifted to the left, the weights of correction gains corresponding to the pixels on the left side among the printing elements 181 increase. In other words, the weight for the correction gain set for the printing element 181*b* on the left side is greater than the weight for the correction gain set for the printing element 181*c* on the right side. Conversely, when an LPF that has filter coefficients with the central position shifted to right is applied to the image data, the application position of the correction gain is shifted to the right. In this case, the weights of correction gains corresponding to the pixels on the right side among the printing elements 181 increase.

As described above, the printing apparatus 1 according to the present embodiment can apply an LPF that has filter coefficients with a shifted central position to image data. This allows selection of the printing elements 181 to which correction gain is to be applied during correction of the output image data.

As in the diffusion filter in FIG. 8, for example, the position where the filter coefficients have a local maximum may be shifted to the right. Application of such a diffusion filter to image data yields a bias in error diffusion towards pixels on the right, but this bias can be compensated for by subsequently applying an LPF that has filter coefficients with the central position shifted to the left. In other words, the printing apparatus 1 according to the present embodiment can compensate for the property by which error diffusion increases to the pixels on the right during conversion by the error diffusion method or the like. This approach allows image data converted by the error diffusion method or the like to be corrected more appropriately.

The printing apparatus 1 and printing correction method according to the present disclosure can reduce an increase in graininess while correcting the printing density.

Embodiments of the present disclosure have been described with reference to drawings and examples. It is to be noted that various changes and modifications will be apparent to those of ordinary skill in the art on the basis of the present disclosure. Therefore, such changes and modifications are to be understood as included within the scope of the present disclosure. For example, the functions or the like included in the various components or steps may be reordered in any logically consistent way. Furthermore, components or steps may be combined into one or divided. While embodiments of the present disclosure have been described focusing on apparatuses, the present disclosure may also be embodied as a method that includes steps performed by the components of an apparatus. Embodiments of the present disclosure may also be implemented as a method executed by a processor provided in an apparatus, as a program, or as a recording medium having a program recorded thereon. Such embodiments are also to be understood as falling within the scope of the present disclosure.

The invention claimed is:

1. A printing apparatus comprising:
a printer comprising a plurality of printing elements configured to print dots; and
a controller configured to
acquire input image data;
acquire a pre-correction printing density that is based on test pattern data and printing characteristics of printing positions of the dots printed by the plurality of printing elements, the test pattern data including a uniform array of pixels;
calculate a target density by averaging the pre-correction printing density;
offset the target density so that the target density is equal to or greater than the pre-correction printing density;
calculate a correction gain of the plurality of printing elements on the basis of a ratio of the target density to the pre-correction printing density; and
control the printer on the basis of the correction gain and the input image data.

2. The printing apparatus of claim 1, wherein the pre-correction printing density is a predicted printing density that is predicted on the basis of the printing characteristics and the test pattern data.

3. The printing apparatus of claim 2, wherein the controller is configured to control the printer with a diffusion filter.

4. The printing apparatus of claim 1, wherein the pre-correction printing density is a measured printing density acquired from a printing result of the test pattern data.

5. The printing apparatus of claim 4, wherein the controller is configured to control the printer with a diffusion filter.

6. The printing apparatus of claim 1, wherein the controller is configured to control the printer with a diffusion filter.

7. The printing apparatus of claim 6, wherein the controller is configured to apply the diffusion filter to the pre-correction printing density.

8. The printing apparatus of claim 7, wherein a position where a filter coefficient is maximized in the diffusion filter is shifted from a center of the diffusion filter.

9. The printing apparatus of claim 6, wherein the controller is configured to apply the diffusion filter to the correction gain.

10. The printing apparatus of claim 9, wherein a position where a filter coefficient is maximized in the diffusion filter is shifted from a center of the diffusion filter.

11. An image correction method for a printing apparatus, the printing apparatus comprising:
a printer comprising a plurality of printing elements configured to print dots; and
a controller configured to control the printer;
the image correction method comprising:
acquiring, using the controller, a pre-correction printing density that is based on test pattern data and printing characteristics of printing positions of the dots printed by the plurality of printing elements, the test pattern data including a uniform array of pixels;
calculating, using the controller, a target density by averaging the pre -correction printing density;
offsetting, using the controller, the target density so that the target density is equal to or greater than the pre-correction printing density;
calculating, using the controller, a correction gain of the plurality of printing elements on the basis of a ratio of the target density to the pre-correction printing density; and
controlling, using the controller, the printer on the basis of the correction gain and the input image data.

12. The image correction method of claim 11, wherein the pre -correction printing density is a predicted printing density that is predicted on the basis of the printing characteristics and the test pattern data.

13. The image correction method of claim 12, further comprising controlling, using the controller, the printer with a diffusion filter.

14. The image correction method of claim 11, wherein the pre -correction printing density is a measured printing density acquired from a printing result of the test pattern data.

15. The image correction method of claim 14, further comprising controlling, using the controller, the printer with a diffusion filter.

16. The image correction method of claim 11, further comprising controlling, using the controller, the printer with a diffusion filter.

17. The image correction method of claim 16, further comprising applying, using the controller, the diffusion filter to the pre-correction printing density.

18. The image correction method of claim 17, wherein a position where a filter coefficient is maximized in the diffusion filter is shifted from a center of the diffusion filter.

19. The image correction method of claim 16, further comprising applying, using the controller, the diffusion filter to the correction gain.

20. The image correction method of claim 19, wherein a position where a filter coefficient is maximized in the diffusion filter is shifted from a center of the diffusion filter.

\* \* \* \* \*